United States Patent
Vik et al.

(10) Patent No.: US 9,663,918 B2
(45) Date of Patent: May 30, 2017

(54) DRIVE WHEEL FOR A TRACK ASSEMBLY OF A WORK VEHICLE

(71) Applicant: CNH Industrial America, LLC, New Holland, PA (US)

(72) Inventors: Brian Vik, Barnesville, MN (US); Daniel Zurn, Horace, ND (US); Jordan Weckerly, West Fargo, ND (US); Russell Stoltman, Argusville, ND (US)

(73) Assignee: CNH Industrial America LLC, New Holland, PA (US)

( * ) Notice: Subject to any disclaimer, the term of this patent is extended or adjusted under 35 U.S.C. 154(b) by 220 days.

(21) Appl. No.: 14/291,089

(22) Filed: May 30, 2014

(65) Prior Publication Data

US 2015/0345109 A1    Dec. 3, 2015

(51) Int. Cl.
| | | |
|---|---|---|
| *B62D 55/12* | (2006.01) | |
| *E02F 9/02* | (2006.01) | |
| *B62D 55/065* | (2006.01) | |
| *B62D 55/24* | (2006.01) | |
| *B62D 55/088* | (2006.01) | |
| *B62D 55/14* | (2006.01) | |

(52) U.S. Cl.
CPC .............. *E02F 9/02* (2013.01); *B62D 55/065* (2013.01); *B62D 55/088* (2013.01); *B62D 55/12* (2013.01); *B62D 55/14* (2013.01); *B62D 55/24* (2013.01)

(58) Field of Classification Search
CPC ...................................................... B62D 55/12
USPC ......................................................... 305/136
See application file for complete search history.

(56) References Cited

U.S. PATENT DOCUMENTS

| | | | | |
|---|---|---|---|---|
| 1,668,778 A | * | 5/1928 | Menningen | F16H 55/50 305/115 |
| 3,068,711 A | * | 12/1962 | Even | B62D 55/0885 474/164 |
| 4,203,633 A | * | 5/1980 | Hare | B62D 55/096 305/136 |
| 5,226,703 A | | 7/1993 | Norman | |
| 5,312,176 A | * | 5/1994 | Crabb | B62D 55/30 180/9.1 |
| 6,010,199 A | | 1/2000 | Hoffart | |

(Continued)

FOREIGN PATENT DOCUMENTS

| | | |
|---|---|---|
| EP | 0270237 | 6/1988 |
| WO | WO 8100831 | 4/1981 |
| WO | 00/02764 | 1/2000 |

OTHER PUBLICATIONS

European Search Report for European Application No. 15169700.0 dated Jul. 28, 2015 (5 pages).

*Primary Examiner* — Joseph Rocca
*Assistant Examiner* — Conan Duda
(74) *Attorney, Agent, or Firm* — Rickard K. DeMille; Rebecca L. Henkel

(57) ABSTRACT

A track assembly for a work vehicle includes an endless track and a drive wheel, the drive wheel defining an inboard side, an outboard side, and a central plane extending therebetween. The drive wheel includes a partition extending between an outer wall and an inner wall. The partition defines an inboard division substantially closed off from an outboard division to reduce an amount of debris or other material from reaching the work vehicle adjacent to which the track assembly may be positioned.

16 Claims, 5 Drawing Sheets

(56) References Cited

U.S. PATENT DOCUMENTS

| | | | |
|---|---|---|---|
| 6,012,784 A * | 1/2000 | Oertley | B60B 17/0034 305/136 |
| 6,129,426 A * | 10/2000 | Tucker | B62D 55/065 305/136 |
| 6,318,484 B2 * | 11/2001 | Lykken | B62D 55/00 180/9.1 |
| 6,457,786 B1 * | 10/2002 | Maguire | B62D 55/15 277/912 |
| 6,527,347 B2 | 3/2003 | Brawley et al. | |
| 6,557,953 B1 | 5/2003 | Kahle et al. | |
| 6,739,678 B2 * | 5/2004 | Moebs | B62D 55/14 295/11 |
| 6,968,914 B2 * | 11/2005 | Tucker | B62D 55/065 180/9.62 |
| 7,188,915 B2 | 3/2007 | Lemke et al. | |
| 7,252,347 B2 | 8/2007 | Gingras | |
| 7,434,897 B2 | 10/2008 | Dom | |
| 7,591,515 B2 | 9/2009 | Breton et al. | |
| 7,597,161 B2 | 10/2009 | Brazier | |
| 8,057,337 B2 | 11/2011 | Clarke | |
| 2001/0025732 A1 * | 10/2001 | Lykken | B62D 49/0678 180/9.48 |
| 2002/0130552 A1 | 9/2002 | Juncker et al. | |
| 2006/0125318 A1 * | 6/2006 | Soucy | B62D 55/125 305/178 |
| 2007/0247002 A1 * | 10/2007 | Huntimer | B62D 55/14 305/136 |
| 2008/0150355 A1 * | 6/2008 | Breton | B62D 55/088 305/107 |
| 2008/0196947 A1 * | 8/2008 | Brazier | B60G 21/04 180/9.5 |
| 2010/0012399 A1 * | 1/2010 | Hansen | B62D 55/04 180/9.26 |
| 2010/0060075 A1 * | 3/2010 | Hansen | B62D 55/04 305/15 |
| 2010/0139994 A1 * | 6/2010 | Hansen | B62D 55/04 180/9.26 |
| 2012/0104840 A1 * | 5/2012 | Zuchoski | B62D 55/084 305/100 |
| 2012/0146400 A1 | 6/2012 | Nebergall et al. | |
| 2012/0153712 A1 * | 6/2012 | Simula | B62D 55/14 305/136 |
| 2012/0161511 A1 * | 6/2012 | Brazier | B62D 55/12 305/178 |
| 2013/0026819 A1 | 1/2013 | Reshad et al. | |
| 2014/0001825 A1 * | 1/2014 | Hakes | B62D 55/202 305/136 |
| 2014/0091616 A1 * | 4/2014 | Joseph Xavier | B62D 55/14 305/136 |
| 2015/0314817 A1 * | 11/2015 | Hobe | B62D 55/15 305/100 |
| 2015/0321710 A1 * | 11/2015 | Zuchoski | B62D 55/14 305/137 |
| 2016/0031500 A1 * | 2/2016 | Renson | B62D 55/145 305/136 |
| 2016/0052569 A1 * | 2/2016 | Buchanan | B62D 55/08 305/142 |
| 2016/0068205 A1 * | 3/2016 | Hellholm | B62D 55/112 180/9.54 |
| 2016/0114840 A1 * | 4/2016 | L'Herault | B62D 55/084 180/9.21 |

* cited by examiner

DRIVE WHEEL FOR A TRACK ASSEMBLY OF A WORK VEHICLE

FIELD OF THE INVENTION

The present disclosure generally relates to a drive wheel for a track assembly, or more particularly to a drive wheel for a track assembly for a work vehicle.

BACKGROUND OF THE INVENTION

Off-highway work vehicles, such as tractors, have been developed for many purposes and are generally used on a wide variety of terrains. For example, certain work vehicles must be capable of traveling over or through dirt, mud, snow, ice, water, and/or various other terrains. In order to increase a work vehicle's ability to travel through such terrains, certain work vehicles include two or more track assemblies to drive and/or steer the work vehicle. The inclusion of two or more track assemblies may increase the work vehicle's ability to engage the various terrains without losing traction and thus may enhance the work vehicle's performance through such sluggish or slippery terrains.

The track assemblies generally include a drive Wheel mechanically engaged with an endless track and a plurality of idler wheels. The idler wheels support the track assembly and keep a desired amount of tension on the endless track. Rotational force is transferred from an engine of the work vehicle through a transmission, drive shaft, and axle to the drive wheel. The axle and drive wheel are then attached such that the drive wheel receives the transferred rotational force and engages the endless track of the work vehicle. The drive wheel generally includes an inner wall attached to the axle through a hub assembly, an outer wall, and radially extending spokes extending from the inner wall to the outer wall. Additionally, the outer wall defines one or more features for engaging the endless track.

However, certain problems exist with such a configuration. For example, debris from the terrain, such as mud, dirt, snow, ice, or a combination thereof, may be carried to the drive wheel from the endless track, and from there may travel, e.g., through the spokes of the drive wheel, to a chassis of the work vehicle. Once the debris is on the chassis of the work vehicle, it may be difficult for an owner or operator of the work vehicle to clean or otherwise remove the debris.

Accordingly, a track assembly for a work vehicle with a drive wheel that is configured to assist in reducing the amount of debris that accumulates on the chassis of the work vehicle during operation of the vehicle would be useful.

BRIEF DESCRIPTION OF THE INVENTION

Aspects and advantages of the invention are set forth below in the following description, or may be obvious from the description, or may be learned through practice of the invention.

In one exemplary embodiment, a track assembly for a work vehicle is provided, the track assembly including an endless track and a drive wheel defining an inboard side, an outboard side, and a central plane extending therebetween. The drive wheel includes a radially outer wall defining a plurality of circumferentially spaced features for mechanically engaging the endless track, as well as a radially inner wall and a partition extending from the inner wall to the outer wall of the drive wheel. The partition meets the inner wall at the central plane and meets the outer wall on the inboard side of central plane such that the partition defines an inboard division substantially closed off from an outboard division.

In another exemplary embodiment, a work vehicle is provided, the work vehicle including an engine, a transmission in mechanical communication with the engine, an axle in mechanical communication with the transmission, and a track assembly. The track assembly is in mechanical communication with the engine and transmission and includes an endless track and a drive wheel defining an inboard side, an outboard side, and a central plane extending therebetween. The drive wheel includes a radially outer wall defining a plurality of circumferentially spaced features for mechanically engaging the endless track, as well as a radially inner wall and a partition extending from the inner wall to the outer wall of the drive wheel. The partition meets the inner wall at the central plane and meets the outer wall on the inboard side of central plane such that the partition defines an inboard division substantially closed off from an outboard division.

In still another exemplary embodiment, a track assembly for a work vehicle is provided, the track assembly including an endless track defining a plurality of longitudinally spaced drive lugs and a drive wheel. The drive wheel defines an inboard side and an outboard side and includes a radially outer wall defining a plurality of circumferentially spaced openings for mechanically engaging the drive lugs on the endless track, as well as a radially inner wall and a partition extending from the inner wall to the outer wall. The partition meets the outer wall of the drive wheel on the inboard side of the openings such that the partition defines an inboard division substantially closed off from an outboard division.

These and other features, aspects and advantages of the present disclosure will become better understood with reference to the following description and appended claims. The accompanying drawings, which are incorporated in and constitute a part of this specification, illustrate embodiments of the disclosure and, together with the description, serve to explain the principles of the disclosure.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Figure 1:
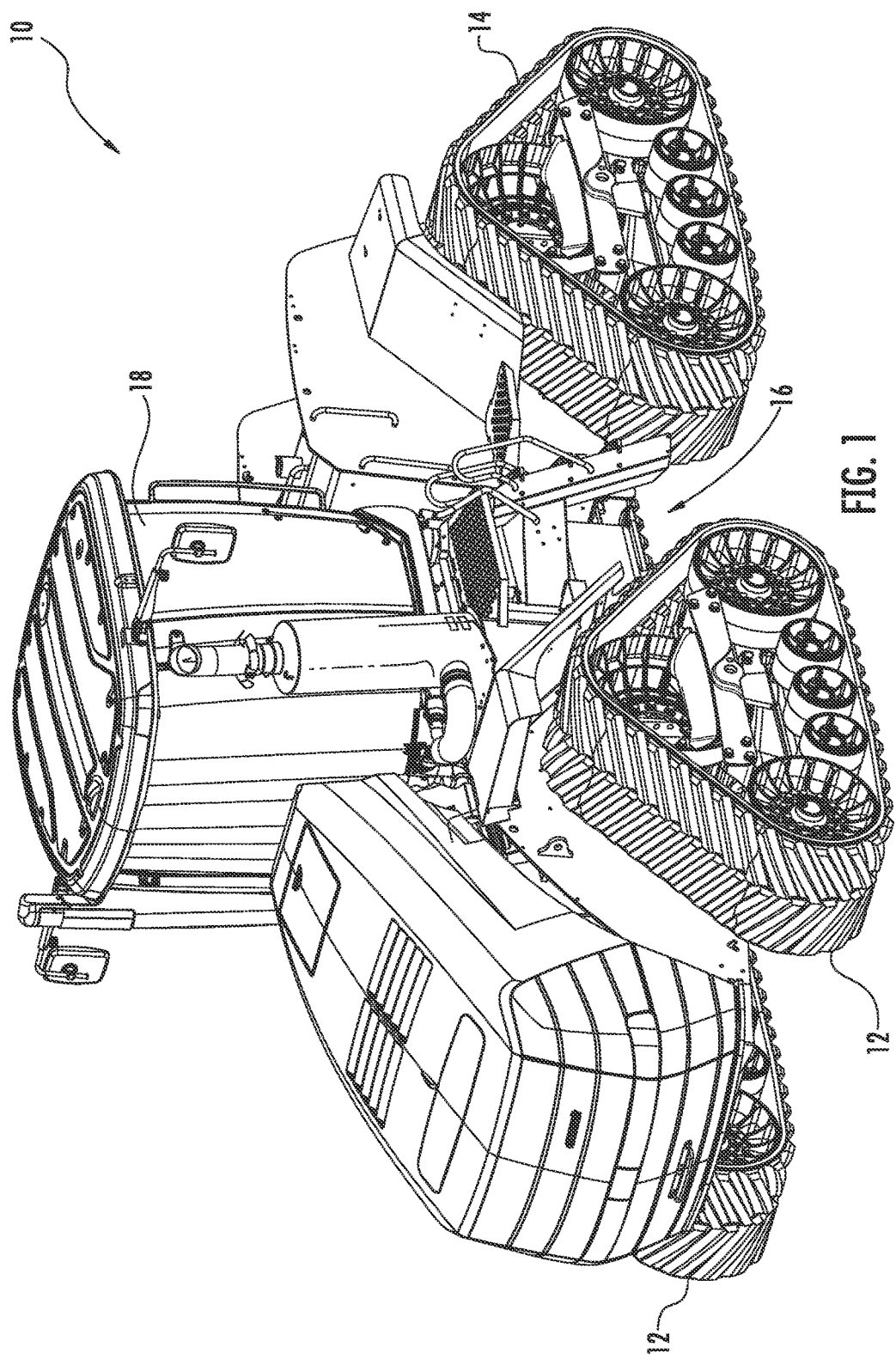
FIG. 1 provides a perspective view of one embodiment of a work. vehicle in accordance with aspects of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a track assembly for a work vehicle including an endless track and a drive wheel, the drive wheel defining an inboard side, an outboard side, and a central plane extending therebetween. The drive wheel includes a partition extending between an outer wall and a radially inner wall. The partition defines an inboard division substantially closed off from an outboard division to reduce an amount of debris or other material from reaching the work vehicle.

Referring now to the drawings, wherein identical numerals indicate the same elements throughout the figures, FIG. 1 provides a perspective view of one embodiment of a work vehicle 10. As shown, the work vehicle 10 is configured as an agricultural tractor. However, in other embodiments, the work vehicle 10 may be configured as any other suitable work vehicle known in the art, including those for agricultural and construction applications, transport, sport, and/or the like.

As shown in FIG. 1, the work vehicle 10 includes a pair of rear track assemblies 12, a pair or front track assemblies 14, and a chassis 16 coupled to and supported by the track assemblies 12, 14. As is generally understood, the work vehicle 10 may also include a drivetrain including an engine, a transmission, a drive shaft, and one or more axle(s) (not shown) supported by the chassis 16 and in mechanical communication with one or more of the front track assemblies 12 and/or the rear track assemblies 14. Additionally, an enclosed operator's cab 18 is supported by a portion of the chassis 16 and may house various control devices (not shown) for permitting an operator to control the operation of the work vehicle 10.

It should be appreciated, however, that the configuration of the work vehicle 10 described above and shown in FIG. 1 is provided only to place the present subject matter in an exemplary field of use. Thus, it should be apparent that the present subject matter may be readily adaptable to any manner of work vehicle configuration. For example, in an alternative embodiment, the work vehicle 10 may include tires in lieu of either the front or rear track assembly 14, 12, may include an open operator's cab 18, and may be configured to be operably coupled to any suitable type of work implement, such as a trailer, spray boom, manure tank, feed grinder, plow and/or the like.

Figure 2:
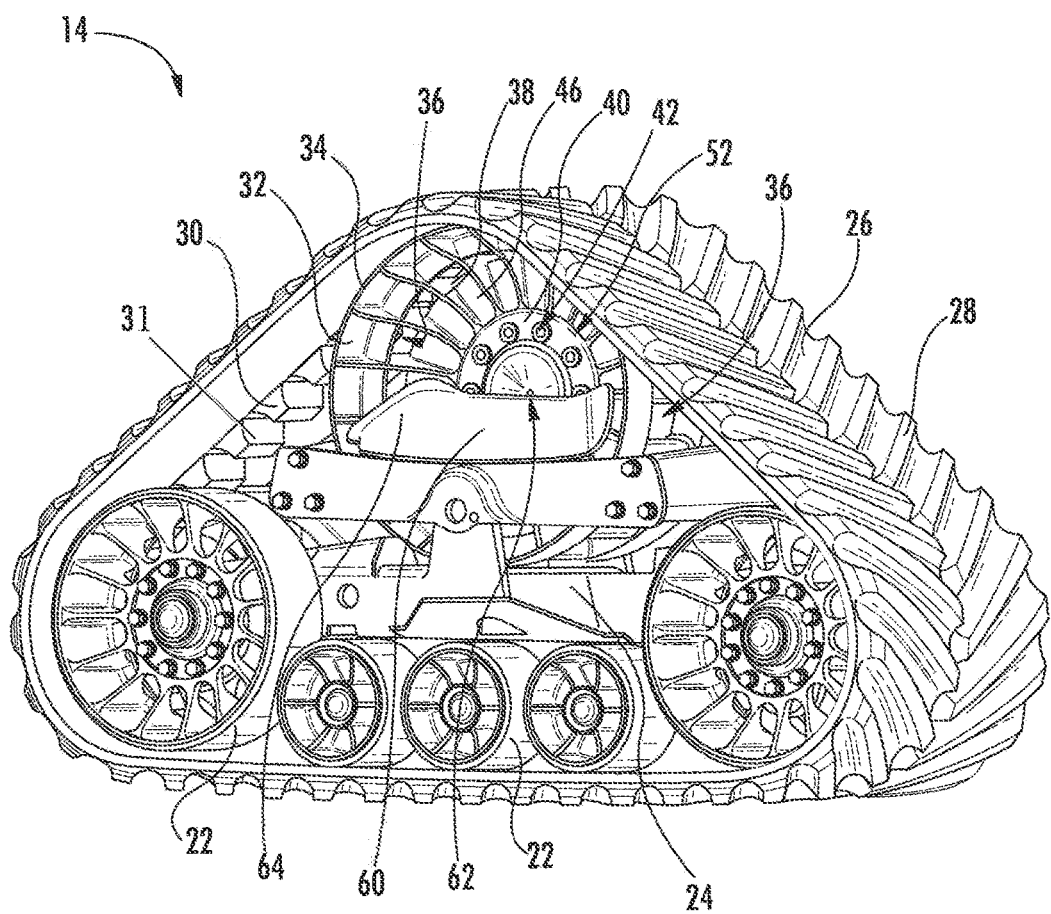
FIG. 2 provides a perspective view of one embodiment of a track assembly in accordance with aspects of the present disclosure.

Referring now to FIG. 2, a perspective view of an exemplary front track assembly 14 is provided. The track assembly 14 depicted generally includes a track 26, a drive wheel 32 for mechanically engaging the track 26, and a plurality of idler wheels 22. The drive wheel 32 defines an outboard side 52 and an inboard side 50 (see FIGS. 2-4) and may be in mechanical communication with the drivetrain of the work vehicle 10.

As used herein, "inboard" and "outboard" are relative terms used to describe areas of a part or assembly relative to the work vehicle 10 (FIG. 1). More particularly, inboard refers to an area of a part or assembly closer to a body or chassis 16 of the work vehicle 10, while outboard refers to an area farther away from the body or chassis of the work vehicle 10. For example, referring back to FIG. 1, the outboard sides of the track assemblies 12, 14 are more prominently depicted.

The drive wheel 32 and idler wheels 22 are connected to a chassis 24 of the track assembly 14 to provide a desired shape for the track assembly 14. The idler wheels 22 may also provide a desired amount of tension in the track 26. The track 26 is depicted as an endless track including a tread pattern 28 defined on an outer surface. "Endless track," as used herein, refers to any track without a first end disconnected from a second end. In certain embodiments, such as in the embodiment of FIG. 2, there may not be a discernable beginning or ending of the endless track, while in other embodiments, the endless track may be comprised of one or more lengths of tracks attached or otherwise connected at a first end and a second end to form a loop. Further, the endless track 26 may be comprised of any suitable material and may define any suitable tread pattern. For example, in certain embodiments, the endless track 26 may be comprised of modular steel plates linked together, or alternatively may be comprised of a rubber material or a steel-reinforced rubber material.

The track 26 additionally includes a plurality of longitudinally spaced drive lugs 30, each drive lug 30 having an outer perimeter 31 (FIG. 2), the drive lugs 30 extending radially inwardly from an inner surface of the track 26. The drive lugs 30 are centrally positioned on the inner surface of the track 26 with respect to an inboard and an outboard side of the track 26 and, as will be discussed below, are mechanically engaged by the drive wheel 32 for rotating the track 26 around the drive wheel 32 and idler wheels 22. The drive lugs 30 may be formed integrally with the track 26 or alternatively may be attached to the track 26 in any suitable manner.

It should be appreciated, however, that the track assembly 14 of FIG. 2, including the configuration of idler wheels 22 and the track 26, are provided by way of example only. In other exemplary embodiments, the track assembly 14 may include any suitable number of or configuration of idler wheels 22. Additionally, or alternatively, other embodiments of the present disclosure may include various other track 26 configurations. For example, in other exemplary embodiments, the track 26 may define various other tread patterns 28 and may define drive lugs 30 of various other shapes, sizes, and/or positions.

Referring still to FIG. 2, the exemplary track assembly 14 additionally includes a scraper 60 attached to the chassis 24 of the track assembly 14. The scraper 60 is mounted adjacent to the outboard side 52 of the drive wheel 32 and includes a leading edge 62 that corresponds in shape to a width of the outboard side 52 of the drive wheel 32. More particularly, the exemplary scraper 60 depicted in FIG. 2 includes a pair of wings 64 that flare outwardly at either end of the scraper 60. Such a configuration allows for a substantially uniform clearance between the leading edge 62 of the scraper 60 and the outboard side 52 of the drive wheel 32, across the width of the drive wheel 32. The scraper 60 may remove a portion of debris from the outboard side 52 of the drive wheel 32. It being understood, however, that in other embodiments of the present disclosure, the track assembly 14 may not include a scraper 60, or alternatively may include any other configuration and/or number of scrapers for removing debris from the outboard side of the drive wheel 32.

Figure 3:
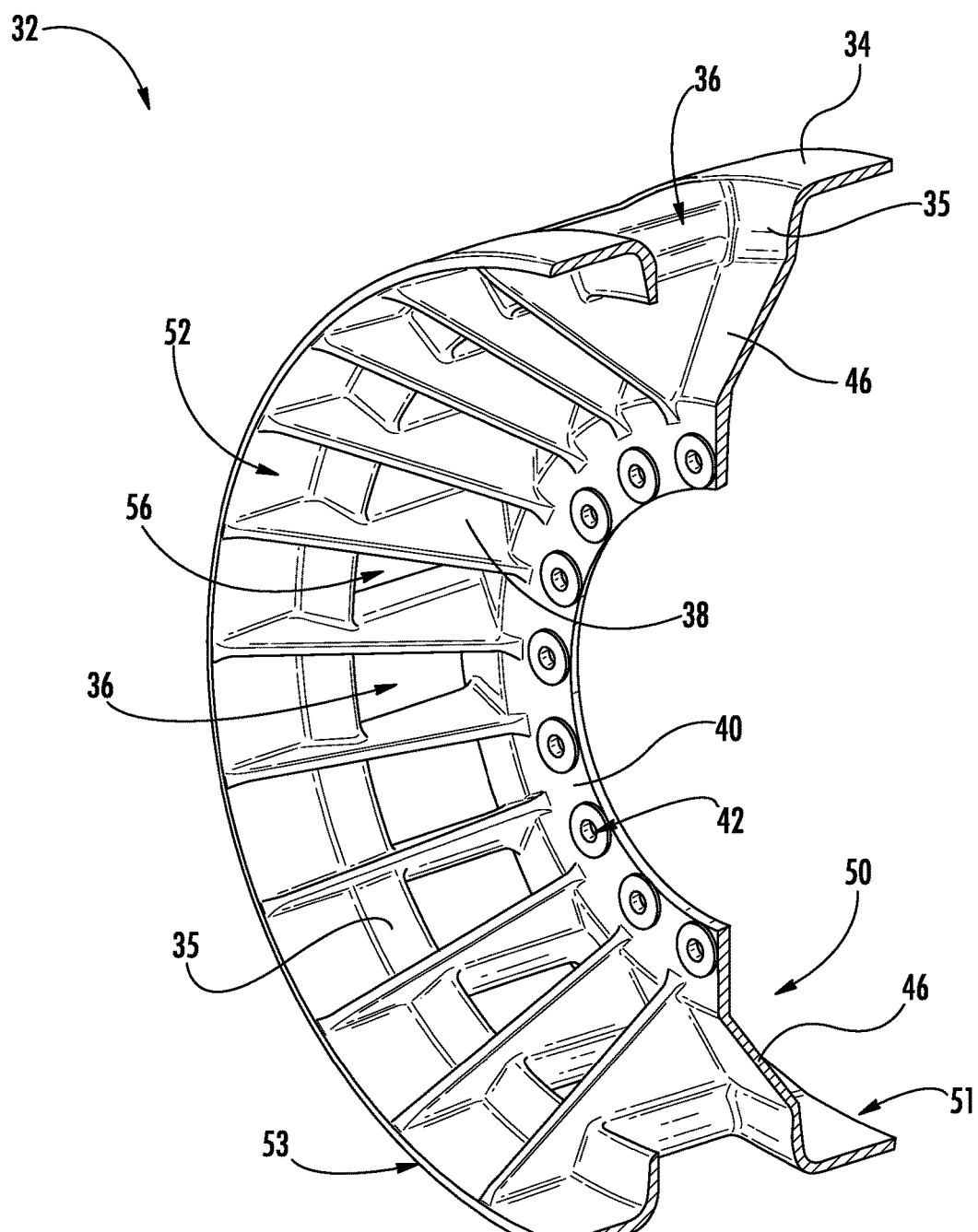
FIG. 3 provides a perspective cross-sectional view of an exemplary drive wheel in accordance with aspects of the present disclosure.
Figure 4:
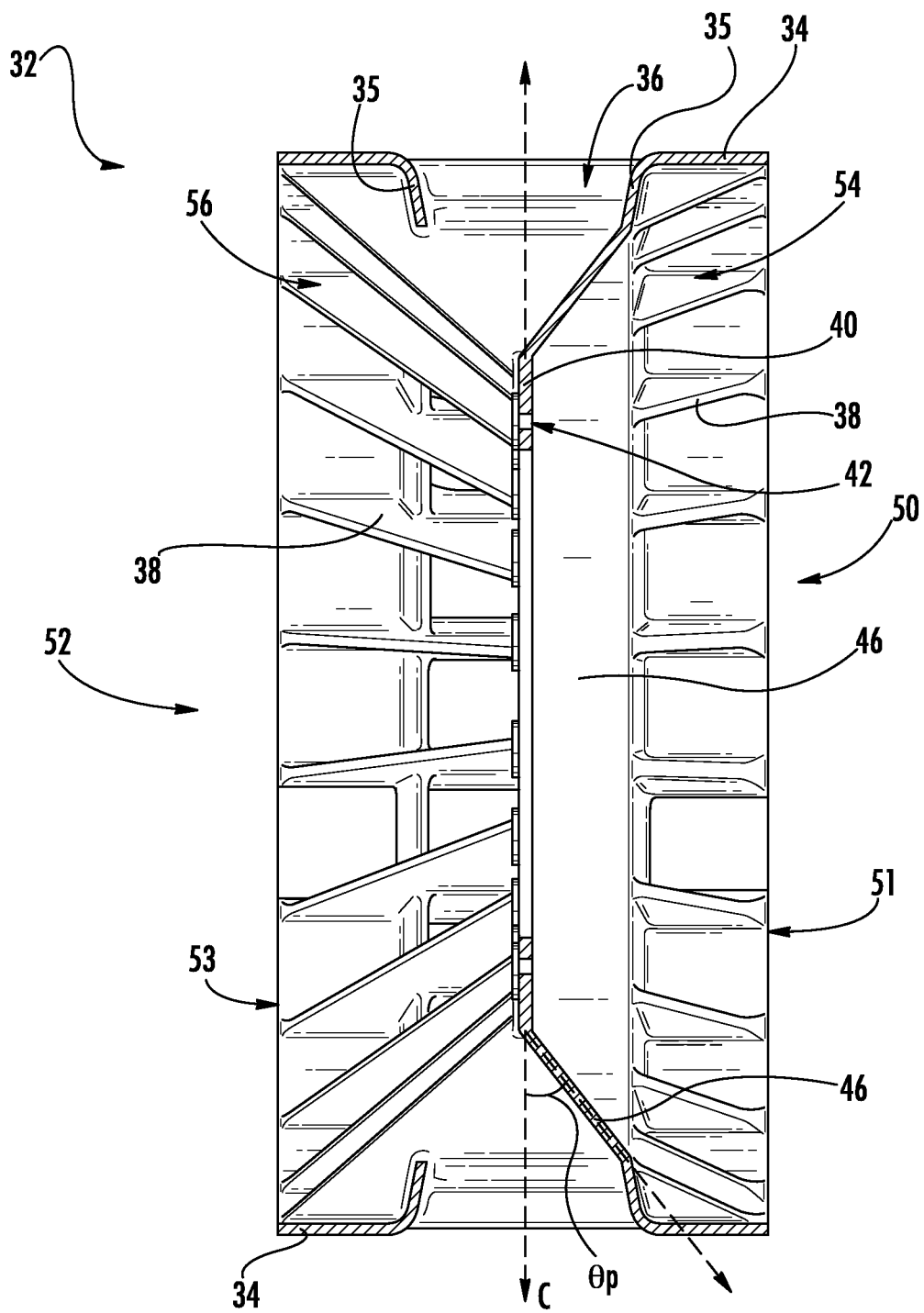
FIG. 4 provides a front cross-sectional view of the exemplary drive wheel of FIG. 3.

Referring now to FIGS. 3 and 4, a perspective cross-sectional view and front cross-sectional view, respectively, are provided of a drive wheel 32 in accordance with aspects of the present disclosure. As depicted, the exemplary drive wheel 32 defines an inboard side 50, an outboard side 52, and a central plane C (see FIG. 4) extending therebetween. For the embodiment shown, the central plane C is positioned half-way between an inboard edge 51 and an outboard edge 53 of the drive wheel 32 and is a meeting point of the inboard side 50 and the outboard side 52. However, in other exemplary embodiments, the central plane C may alternatively be defined at any other suitable location between the inboard and outboard edges 51, 53 of the drive wheel 32.

The drive wheel 32 further includes a radially outer wall 34 and a radially inner wall 40. The outer wall 32 defines a plurality of circumferentially spaced features for mechanically engaging the track 26 (FIG. 2). More particularly, for the embodiment depicted in FIGS. 3 and 4, the features correspond to a plurality of circumferentially spaced openings 36 configured to receive the drive lugs 30 defined by the track 26 (FIG. 2). The openings 36 are defined by the outer wall 34, which includes perimeter walls 35 encircling each opening 36 and extending radially inwardly towards the inner wall 40.

Referring still to FIGS. 3 and 4, the inner wall 40 defines a plurality of circumferentially spaced attachment points 42 for attaching the drive wheel 32 to the hub 44 of the work vehicle 10 (see FIG. 1). Further, the drive wheel 32 includes a plurality of spokes 38 extending from the outer wall 34 to the inner wall 40. The spokes 38 provide structural support for the drive wheel 32 and, for the embodiment of FIGS. 3 and 4, are generally triangular in shape—sloping outwardly as they extend from the inner wall 40 towards the edges 51, 53 of the outer wall 34.

It should be appreciated, however, that in other exemplary embodiments, the spokes 38 may have any other shape for providing structural support for the drive wheel 32 and the outer wall 34 may define any other suitable features for mechanically engaging the track 26. For example, in other exemplary embodiments, the outer wall 34 may not define the walls 35 and may instead define any other suitable shape for receiving and supporting, e.g., the drive lugs 30 from the track 26 (see FIG. 2). Moreover, in other exemplary embodiments, the openings 36 may be offset relative to the central plane C in order to correspond to an alternative position of the drive lugs 30 on the track 26.

The drive wheel 32 of FIGS. 3 and 4 further includes a partition 46 extending from the inner wall 40 to the outer wall 34 of the drive wheel 32. The exemplary partition 46 of FIGS. 3 and 4 meets the inner wall 40 at the central plane C and meets the outer wall 34 on the inboard side 50 of central plane C. For the embodiment depicted, the partition 46 is a continuous wall between the inner wall 40 and the outer wall 34 that defines an angle $\theta_P$ greater than zero with respect to the central plane C (FIG. 4). More particularly, for the exemplary embodiment shown, the angle $\theta_P$ of the partition 46 with respect to the central plane C is approximately 45 degrees. However, in other exemplary embodiments, the angle $\theta_P$ of the partition 46 may instead be about 15 degrees or greater, about 30 degrees or greater, or about 60 degrees or greater. Alternatively, in other exemplary embodiments, the angle $\theta_P$ of the partition 46 may be less than about 15 degrees.

Further, as is also depicted, the partition 46 meets the outer wall 34 on the inboard side 50 of the openings 36 defined by the outer wall 34. More particularly, for the embodiment depicted in FIGS. 3 and 4, the partition 46 meets the perimeter walls 35 surrounding the openings 36 on the inboard side 50 of the openings 36 defined by the outer wall 34.

For the embodiment of FIGS. 3 and 4, the partition 46 extends substantially in a straight line from the inner wall 40 to the outer wall 34 and is made integrally with the inner wall 40 and outer wall 34. For example, the entire drive wheel 32 may be cast as a single unit. Additionally, the exemplary partition 46 is approximately as thick as the inner wall 40 and the outer wall 34. However, in other exemplary embodiments, the partition 46 may instead extend in a curved or stepped fashion from the inner wall 40 to the outer wall 34, may be comprised of one or more segments attached to the drive wheel 32 in any suitable manner, such as by welding or by being bolted on, and additionally or alternatively, may be less thick or thicker than the inner wall 40 and/or the outer wall 34.

Figure 5:
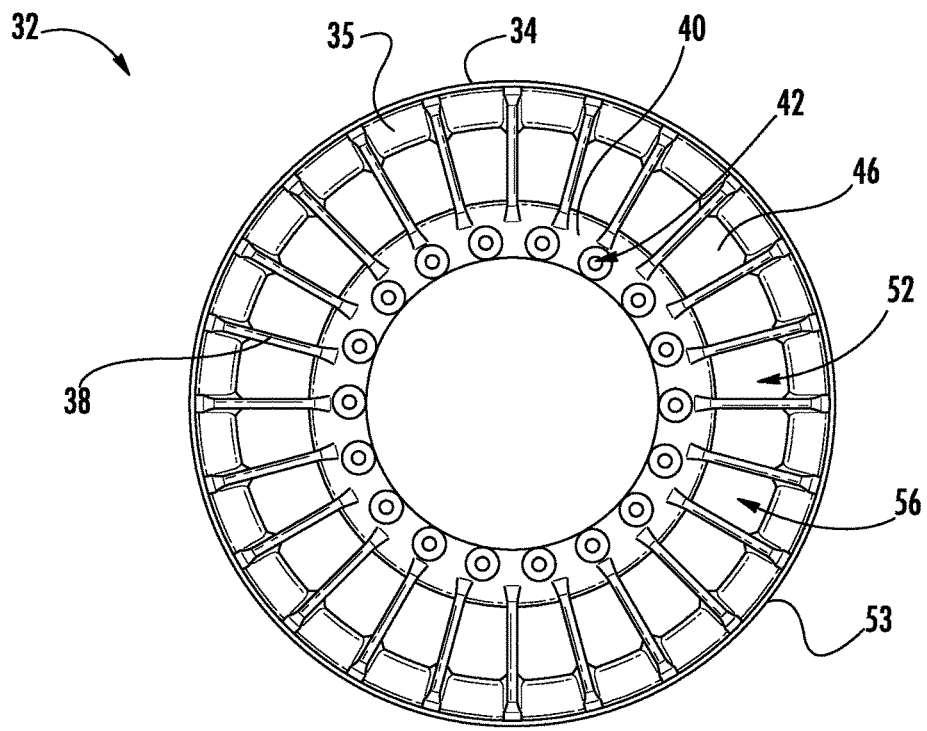
FIG. 5 provides an outboard side view of the exemplary drive wheel of FIG. 3; and provides an inboard side view of the exemplary drive wheel of FIG. 3.
Figure 6:
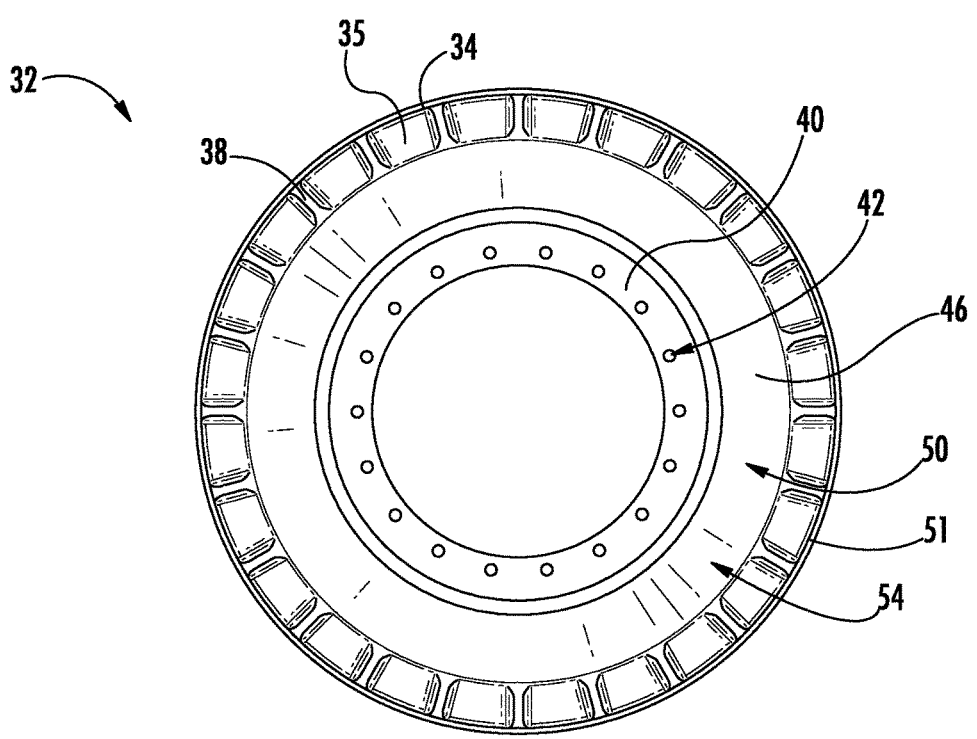

Referring also to FIGS. 5 and 6, an outboard side 52 view and an inboard side 50 view, respectively, are provided of the drive wheel 32 of FIG. 3. As shown, the partition 46 substantially closes off the inboard side 50 of the drive wheel 32 from the outboard side 52 of the drive wheel 32. Accordingly, the partition 46 defines an inboard division 54 (FIG. 6) substantially separated and closed off from an outboard division 56 (FIG. 5) between the inner wall 40 and the outer wall 34. More particularly, the inboard division 54 may be defined as the area between the inboard edge 51 and the partition 46 in an axial direction, and between the radially inner wall 40 and the radially outer wall 34 in a radial direction. Similarly, the outboard division 56 may be defined as the area between the outboard edge 53 and the partition 46 in the axial direction, and between the radially inner wall 40 and the radially outer wall 34 in the radial direction. For the embodiment depicted in the Figs., the inboard division 54 is completely closed off from the outboard division 56 using a continuous partition 46. However, in other exemplary embodiments, the inboard division 54 may not be completely closed off from the outboard division 56 and the partition 46 may include one or more openings.

A drive wheel 32 having such a configuration may minimize an amount of debris, such as mud, dirt, snow, ice, water, waste, or a combination thereof, that attaches to the chassis 16 of the work vehicle 10 during operation of the work vehicle 10 (FIG. 1). During operation, debris attaches to the track 36, travels to the drive wheel 32, and is forced through the plurality of openings 36 in the drive wheel 32 when the drive wheel 32 mechanically engages the track 26 by receiving the plurality of drive lugs 30. However, with the inclusion of the partition 46 extending between the inner wall 40 and the outer wall 34, the partition 46 meeting the outer wall 34 on the inboard side 50 of the openings 36, the debris may be forced to the outboard side 52 of the drive wheel 32 and track assembly 14 (and not through the spokes 38 to the chassis 16 adjacent to the inboard side 50 of the drive wheel 32). Additionally, in certain exemplary embodiments, such as the embodiment of FIG. 2, the chassis 24 of the track assembly 14 may include the scraper 60 to minimize an amount of debris that is attached to the outboard side 52 of the drive wheel 32. Accordingly, with such a configuration, less debris may reach the chassis 16 of the work vehicle 10, requiring less cleaning or removing of debris from the chassis 16 of the work vehicle 10 (FIG. 1).

It should be appreciated that although the present disclosure is generally described with reference to the front track assembly 14, in other exemplary embodiments, one or both of the rear track assemblies 12 may additionally, or alternatively, include one or more of the above described features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other and examples are intended to be within the scope of the claims if they include structural elements that do not differ from the literal language of the claims, or if they include equivalent structural elements with insubstantial differences from the literal language of the claims.

What is claimed:

1. A track assembly having a chassis for a work vehicle, comprising:
    an endless track including a plurality of longitudinally spaced drive lugs; and
    a drive wheel rotatably mounted to the chassis and including an inboard side, an outboard side, and a central plane extending therebetween, the drive wheel comprising
        a radially outer wall defining a plurality of circumferentially spaced features for mechanically engaging the endless track, the features including
            a plurality of partitions, each partition extending from an inner wall of the outboard side at the central plane to the outer wall of the drive wheel, the outer wall and each partition cooperating to define a perimeter which forms an opening extending only to the outboard side,
    wherein when a drive lug of the endless track extends through each opening, the partition extends completely about an outer perimeter of the drive lug as the endless track moves over the drive wheel, and
    wherein debris carried through each opening is urged toward the inner wall of the outboard side such that debris is positioned to move away from the track assembly.

2. The track assembly of claim 1, wherein each partition is formed from a combination of the outer wall, a plurality of spaced-apart spokes, and perimeter walls of the inboard side and the outboard side.

3. The track assembly of claim 1, wherein the partitions meet the radially outer wall on the inboard side of the openings defined by the radially outer wall.

4. The track assembly of claim 1, wherein the drive wheel further comprises a plurality of spokes extending from the inner wall to the radially outer wall.

5. The track assembly of claim 1, wherein each partition defines an angle greater than fifteen degrees with respect to the central plane.

6. The track assembly of claim 2, wherein debris carried through each opening is urged therethrough by a combination of each lug which extends therethrough, perimeter walls, and spokes.

7. The track assembly of claim 1, further comprising a plurality of idler wheels rotatably mounted to the chassis, and wherein the drive wheel is centered at least partially above the plurality of idler wheels.

8. The track assembly of claim 1, wherein a scraper is mounted to the chassis next to the outboard side of the drive wheel, the scraper configured to remove a portion of debris from the outboard side of the drive wheel.

9. A work vehicle comprising:
    an engine;
    a transmission in mechanical communication with the engine;
    a work vehicle chassis supporting the engine and transmission; and
    a track assembly having a chassis and supported by the work vehicle's chassis and in mechanical communication with the engine and transmission, the track assembly comprising
        an endless track including a plurality of longitudinally spaced drive lugs; and
        a drive wheel rotatably mounted to the chassis and including an inboard side, an outboard side, and a central plane extending therebetween, the drive wheel comprising
            a radially outer wall defining a plurality of circumferentially spaced features for mechanically engaging the endless track, the features including
                a plurality of partitions, each partition extending from an inner wall of the outboard side at the central plane to the outer wall of the drive wheel, the outer wall and each partition cooperating to define a perimeter which forms an opening extending only to the outboard side,
        wherein when a drive lug of the endless track extends through each opening, the partition extends completely about an outer perimeter of the drive lug as the endless track moves over the drive wheel, and
        wherein debris carried through each opening is urged toward the inner wall of the outboard side such that debris is positioned to move away from the track assembly.

10. The work vehicle of claim 9, wherein each partition formed from a combination of a portion of the outer wall, a plurality of spaced-apart spokes, and perimeter walls of the inboard side and the outboard side.

11. The work vehicle of claim 10, wherein the partitions meet the radially outer wall on the inboard side of the openings defined by the radially outer wall.

12. The work vehicle of claim 10, further comprising a plurality of idler wheels rotatably mounted to the chassis, and wherein the drive wheel is centered at least partially above the plurality of idler wheels.

13. The work vehicle of claim 9, wherein the drive wheel further comprises a plurality of spokes extending from the inner wall to the radially outer wall.

14. The work vehicle of claim 10, wherein the debris carried through each opening is urged therethrough by a combination of each lug which extends therethrough, perimeter walls, and spokes.

15. The work vehicle of claim 12, wherein a scraper is mounted to the chassis next to the outboard side of the drive wheel, the scraper configured to remove a portion of debris from the drive wheel.

16. The work vehicle of claim 9, wherein each partition defines an angle greater than fifteen degrees with respect to the central plane.

* * * * *